(12) United States Patent
Cavallerano et al.

(10) Patent No.: US 7,539,391 B2
(45) Date of Patent: May 26, 2009

(54) METHOD AND APPARATUS FOR TRICK-MODE SUPPORT OF AUDIO/VIDEO/DATA STREAMS WITH CONDITIONAL ACCESS

(75) Inventors: Alan P. Cavallerano, White Plains, NY (US); Richard Chi-Te Shen, Leonia, NJ (US)

(73) Assignee: NXP B.V., Eindhoven (NL)

( * ) Notice: Subject to any disclaimer, the term of this patent is extended or adjusted under 35 U.S.C. 154(b) by 1594 days.

(21) Appl. No.: 10/183,779

(22) Filed: Jun. 27, 2002

(65) Prior Publication Data

US 2004/0001693 A1    Jan. 1, 2004

(51) Int. Cl.
*H04N 5/91* (2006.01)
(52) U.S. Cl. .............. 386/68; 386/88; 386/12; 386/94; 386/95; 386/66; 386/124
(58) Field of Classification Search .......... 386/95, 386/48, 66, 68, 52, 88, 94, 12, 124
See application file for complete search history.

(56) References Cited

U.S. PATENT DOCUMENTS

| | | | | |
|---|---|---|---|---|
| 5,406,279 A | * | 4/1995 | Anderson et al. | 341/51 |
| 5,818,933 A | * | 10/1998 | Kambe et al. | 705/57 |
| 6,292,899 B1 | * | 9/2001 | McBride | 726/22 |
| 6,785,390 B1 | * | 8/2004 | Hiraide | 380/262 |
| 6,963,972 B1 | * | 11/2005 | Chang et al. | 713/153 |
| 7,376,233 B2 | * | 5/2008 | Candelore et al. | 380/217 |
| 2002/0120854 A1 | * | 8/2002 | LeVine et al. | 713/189 |
| 2003/0061477 A1 | * | 3/2003 | Kahn et al. | 713/150 |
| 2005/0187880 A1 | * | 8/2005 | Ezaki | 705/59 |
| 2007/0110228 A1 | * | 5/2007 | Saito | 380/28 |

* cited by examiner

*Primary Examiner*—Thai Tran
*Assistant Examiner*—Helen Shibru
(74) *Attorney, Agent, or Firm*—Aaron Waxler

(57) ABSTRACT

A method for trick-mode play of an encrypted transport stream containing audio/video/data information comprising: extracting and decrypting data used as local metadata for programs in the encrypted transport stream; creating trick-mode pointers from the metadata; and storing the trick-mode pointers and the encrypted transport stream on a storage medium.

17 Claims, 6 Drawing Sheets

METHOD AND APPARATUS FOR TRICK-MODE SUPPORT OF AUDIO/VIDEO/DATA STREAMS WITH CONDITIONAL ACCESS

FIELD OF THE INVENTION

The present invention relates to the field of trick-mode play of audio/video/data streams; more specifically, it relates to a method and an apparatus for providing trick-mode play of encrypted access audio/video/data streams.

BACKGROUND OF THE INVENTION

In digital satellite and cable technology, source material, i.e. programs, in the form of a digital transport stream are often encrypted by the service provider using Conditional Access (CA). The CA key is provided to the end user, usually in the form of a chip or magnetic card or other means in the users system unit that allows reading of audio, video and data decryption keys within the transport stream. The CA key allows access to additional encryption keys within the transport stream. In order to provide trick-modes the source material must be decrypted and de-muxed in order to generate pointer files so the system unit can find specific portions of the source material and the source material itself stored for later play back. Trick-modes are defined infra. Generally, the source material is not stored "in the clear," so it is encrypted before storage using a key provided by the system unit provider. An example of a system for accomplishing the aforementioned is illustrated in FIG. 1 and will now be described.

FIG. 1 is schematic diagram of a related art system for trick-mode play of audio/video streams. In FIG. 1 a system unit 100 includes a play section 105 and a trick-mode section 110. Play section 105 includes a transport stream decryptor 115, a transport stream demuxer 120, a system controller 125, a switch 130 (under the control of the system controller) and an audio/video (A/V) decoder and decompressor 135. Trick-mode section 110 includes a pointer file generator 140, a storage controller 145 under the control of system controller 125, a rescrambler 150, a storage medium 155 and a decrambler 160.

In operation, a transport stream is received by transport stream decryptor 115 and decrypted by the transport stream decryptor using a CA key provided by the service provider. Transport stream demuxer 120, demuxes the decrypted transport stream into an audio stream, a video stream and a data stream. The audio, video and data streams are then sent to switch 130, pointer file generator 140, and rescrambler 150. For real-time play, system controller 125 sets switch 130 to direct, when a mode signal 165 is set for real-time play, and the audio, video and data streams directed to A/V decoder and decompressor 135, which decompresses and decodes the signal components into a standardized format for display.

Rescrambler 150 encrypts the audio, video and data streams are encrypted using a key provided by the system unit manufacturer (not the CA key used by service provider to originally encrypt the transport stream) or a fixed encryption method not even requiring a key and saves the encrypted audio, video and data streams onto storage medium 155 a fixed encryption method not even requiring a key. Pointer generator 140 generates a trick-mode pointers from the decrypted transport stream and injects the trick-mode pointers into the encrypted audio, video and data streams stored on storage media 155. Descrambler 160 descrambles the stored streams using the key used by rescrambler 150, (again this is the key provided by the system unit manufacturer and not the key not the CA key used by service provider to originally encrypt the transport stream or a fixed decryption method not requiring a key) and passes the stored streams having trick-play pointers to A/V decoder and decompressor 135 when mode signal 165 sets switch 130 for play back.

Inherent with this type of system is the fact that the stored program is encrypted using a key provided by the system manufacturer not the service provider. Therefore, the service provider has effectively given up access control. This creates two problems, the first being, the service provider may object to giving up access control, and the second being the program encrypted by using a "local" key may be more susceptible to unauthorized access.

SUMMARY OF THE INVENTION

A first aspect of the present invention is a method for trick-mode play of an encrypted transport stream containing audio/video/data information comprising: extracting and decrypting data used as local metadata for programs in the encrypted transport stream; creating trick-mode pointers from the metadata; and storing the trick-mode pointers and the encrypted transport stream on a storage medium.

A second aspect of the present invention is a method of creating an encrypted trick-mode transport stream containing audio/video/data information for delayed play comprising: decrypting an encrypted transport stream to create a decrypted transport stream; demuxing the decrypted transport stream to create at least a data stream; creating trick-mode pointers from the data stream; and inserting the trick-mode pointers into the encrypted transport stream.

A third aspect of the present invention is a system for trick-mode play of audio/video/data information from an encrypted transport comprising: a transport stream decryptor for decrypting the encrypted transport stream into a decrypted transport stream; a transport stream demuxer for demuxing the decrypted transport stream into an audio stream, a video stream and a data stream; a metadata section for receiving the encrypted transport stream and for creating trick-mode pointers; and a storage medium for storing the trick-mode pointers and the encrypted transport stream.

A fourth aspect of the present invention is a system for trick-mode play of audio/video/data information from an encrypted transport comprising: a first transport stream decryptor for decrypting the encrypted transport stream into a decrypted transport stream; a first transport stream demuxer for demuxing the decrypted transport stream into an audio stream, a video stream and a data stream; a metadata section, the metadata section comprising: a second transport stream decryptor for decrypting the encrypted transport stream into a decrypted transport stream; a second transport stream demuxer for demuxing the decrypted transport stream into an audio stream, a video stream and a data stream; and a metadata processor for creating trick-mode pointers; and a storage medium for storing the trick-mode pointers and the encrypted transport stream.

A fifth aspect of the present invention is a system for trick-mode play of audio/video/data information from an encrypted transport comprising: a first transport stream decryptor for decrypting the encrypted transport stream into a decrypted transport stream; a first transport stream demuxer for demuxing the decrypted transport stream into an audio stream, a video stream and a data stream; a metadata section, the metadata section comprising: a second transport stream decryptor a first transport stream decryptor for decrypting the encrypted transport stream into a decrypted transport stream; a second transport stream demuxer for demuxing the decrypted transport stream into an audio stream, a video stream and a data stream; and a metadata processor for creating trick-mode pointers; delay means for creating a time-delayed encrypted transport stream; a storage medium; and control means for synchronized insertion of the trick-mode pointers into the time-delayed encrypted transport stream as the time-delayed encrypted transport stream is written to the storage medium.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

For the purposes of the present disclosure encrypting, scrambling and ciphering and their derivatives, all express the same action or effect. When the terms "to display," "real-time play" and "delayed-play" are used, those terms are meant to include not only display of video streams, but play of audio streams and data streams as well. A trick-mode is defined as any time skewed effect impressed upon audio, video, or data signals such as, for example, delayed play, fast forward and reverse, slow motion, stop motion, freeze frame, strobe effects, book marking and search. Metadata is data about data. In the present disclosure metadata includes information such as, for example, copy protection scheme information, copyright information, program guides, program title, program subject, closed captions, program ratings and other program specific information as well as information about the size, coding and type of files in the data stream. While primarily intended to process data contained in encrypted Motion Pictures Experts Group-2 (MPEG-2) compliant transport streams, the present invention is applicable to encrypted transport streams that use other conventions such as MPEG-1 and MPEG-4. Generally MPEG transport streams (TS) are composed of program streams (PS), each program stream composed of packetized elementary streams (PES), the packetized elementary streams include audio, video, data and metadata packets. For the purposes of the present invention, CA encryption generally means the encryption system and method that is included within the MPEG-2 standard, however the definition of CA encryption may be expanded to include any encryption system or method applied to a transport stream by the service provider.

Figure 1:
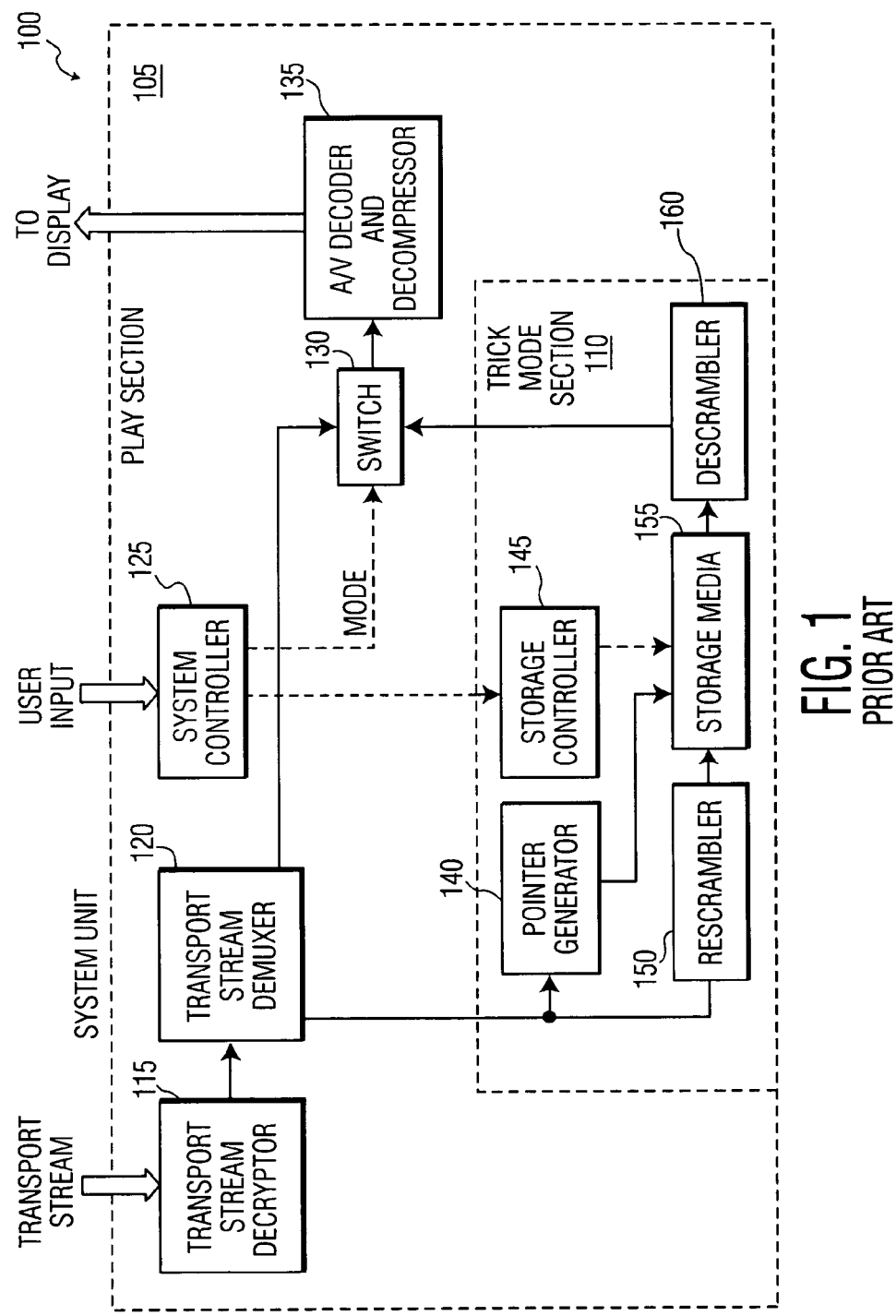
FIG. 1 is schematic diagram of a related art system for trick-mode play of audio/video streams.
Figure 2:
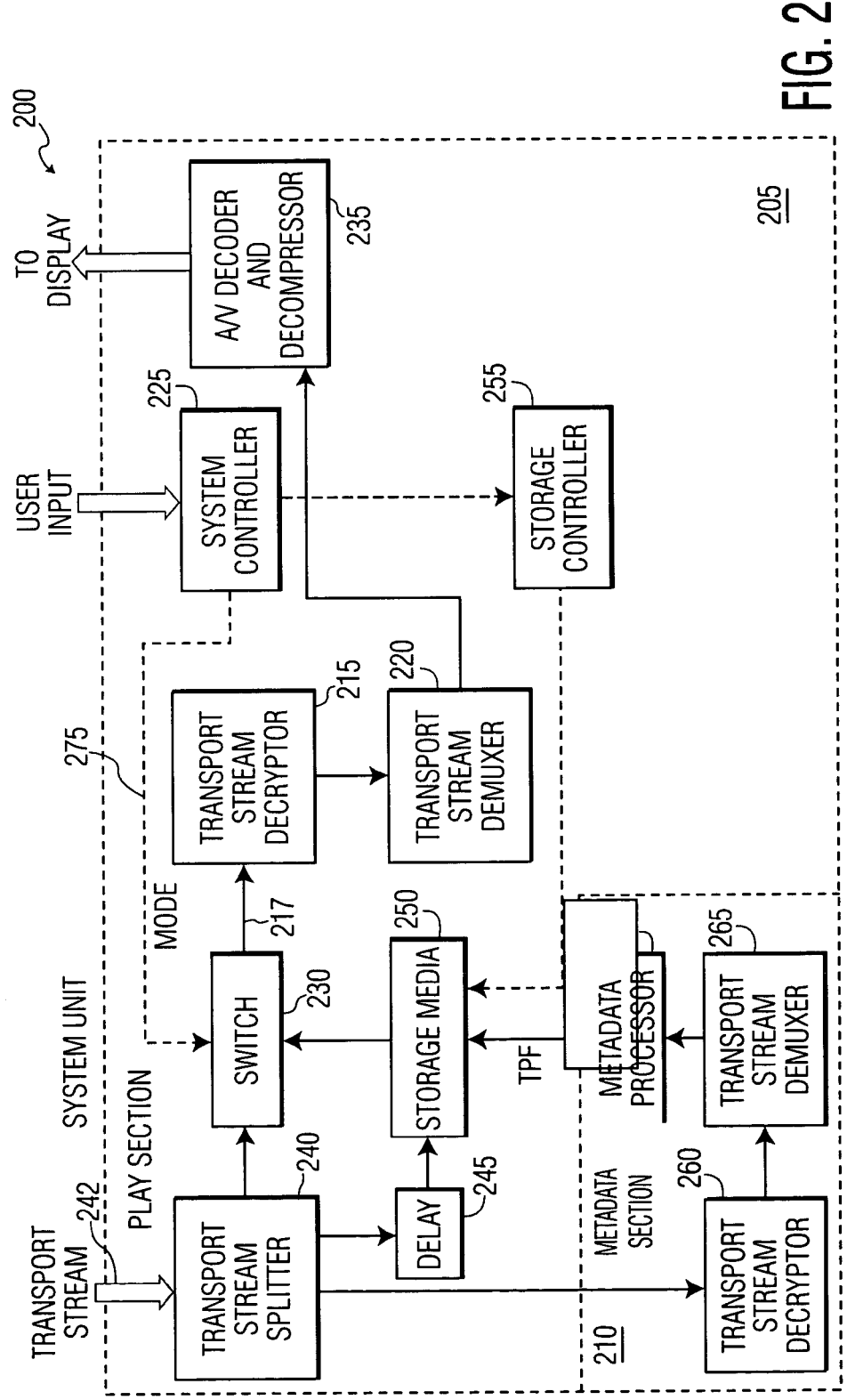
FIG. 2 is schematic diagram of system for trick-mode play of audio/video streams according to a first embodiment of the present invention.

FIG. 2 is schematic diagram of system for trick-mode play of audio/video streams according to a first embodiment of the present invention. In FIG. 2 a system unit 200 includes a play section 205 and a metadata section 210. Play section 205 includes a first transport stream decryptor 215, a first transport stream demuxer 220, a system controller 225, a switch 230 (under the control of the system controller), an audio/video (A/V) decoder and decompressor 235, a transport stream splitter 240, a delay 245, a storage medium 250 and a storage controller 255 (also under the control of the system controller). Storage medium 250 may include hard disks, re-writable CDs or DVDs or semiconductor memory or combinations thereof. Metadata section 210 includes a second transport stream decryptor 260, a second transport stream demuxer 265 and a metadata processor 270.

In operation, a transport stream is received by transport stream splitter 240 via system input 242 and sent to: switch 230 for real-time play; delay 240 and thence to storage medium 250 for storage for delayed play; and to second transport stream decryptor 260. It is important to note that the transport stream stored on storage medium 250 is encrypted with the service providers keys. Switch 230 is activated by a mode signal 275 sent by system controller 225. For real-time play, switch 230 connects, in response to a real-time mode signal from system controller 225, the transport stream to first transport stream decryptor 215 via input 217. For delayed play, switch 230 connects, in response to a delay-play mode signal from system controller 225, storage medium 250 to first transport stream decryptor 215. Mode signals 275 are generated by system controller 225 in response to input by a user of system 200. From switch 230, the transport stream is decrypted by first transport stream decryptor 215 using the CA key and keys within the transport stream and provided by the service provider. First transport stream demuxer 220 demuxes the decrypted transport stream into various real-time signal components such as audio, video and data signals. The demuxed signals are then sent to A/V decoder and decompressor 235, which decompresses and decodes the signal components into a standardized format for display. Control signals are sent by system controller 225 to storage medium 250 via storage controller 255 when delayed play is active.

In metadata section 210, the transport stream is decrypted by second transport stream decryptor 260 using the CA key provided by the service provider to access decryption keys within the transport stream. Second transport stream demuxer 265 then demuxes the decrypted transport stream into audio, video and data streams. The demuxed streams are then sent to metadata processor 270, which generates trick-play pointers from the data stream and inserts the trick-play pointers into the encrypted transport stream as the stream is written to storage medium 250. The trick play pointers allow the start/stop for trick-play to be found in the encrypted data stream. Trick-mode pointers include the location of decryption keys in the encrypted transport stream that are used for delayed play decrypting of the transport stream. Delay 245 keeps the flow of the encrypted transport stream into storage medium 250 in synchronization with the flow of pointers from metadata section 210 into the storage medium and is generally a fixed delay based on the signal propagation through and processing time in the metadata section.

In the first embodiment, second transport stream decryptor 260 decrypts the entire transport stream and second transport stream demuxer 265 demuxes the stream into an audio stream, a video stream and a data stream. Metadata processor 270 uses only the data stream, the audio and video streams are discarded. Thus, trick play mode is enabled while still maintaining the service providers CA and at no time is unencrypted audio/video/data program information stored or stored with any other form of encryption except the service providers CA.

Figure 3:
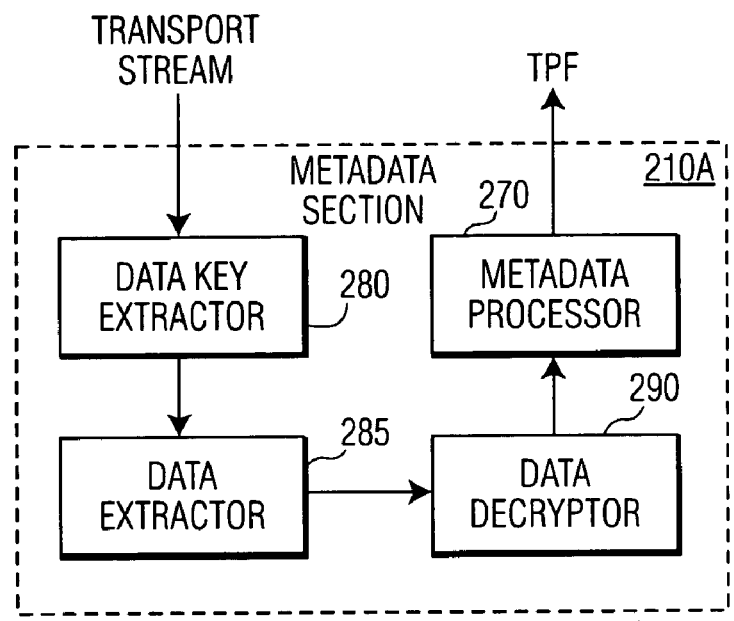
FIG. 3 is schematic diagram of a first alternative metadata section for the system of FIG. 2 for creating trick-mode pointers according to a second embodiment of the present invention.

FIG. 3 is schematic diagram of a first alternative metadata section for the system of FIG. 2 for creating trick-mode pointers according to a second embodiment of the present invention. In the second embodiment, the transport stream contains a service provider supplied data decryption key. The data decryption key allows identification and access to only the packets making up the data stream in the transport stream and not the video or audio packets in the transport stream. In FIG. 3, a metadata section 210A includes a data key extractor 280, a data extractor 285, a data decryptor 290 and metadata processor 270. Data key extractor 280 extracts (using the CA key) a data identification and decryption key from the transport stream. The transport stream and data key are passed to data extractor 285 where a data stream is extracted from the transport stream.

Data decryptor 290, decrypts the data stream, again using the data key and the decrypted data is passed to metadata processor 270 where the data stream is processed into trick-mode pointers as describe supra.

Data extractor 285 and data decryptor 290 may be combined into a single unit and the data key may actually be a series of keys, one key (or set of keys) for identification of the data packets and one key (or set of keys) for decryption of the data packets.

Figure 4:
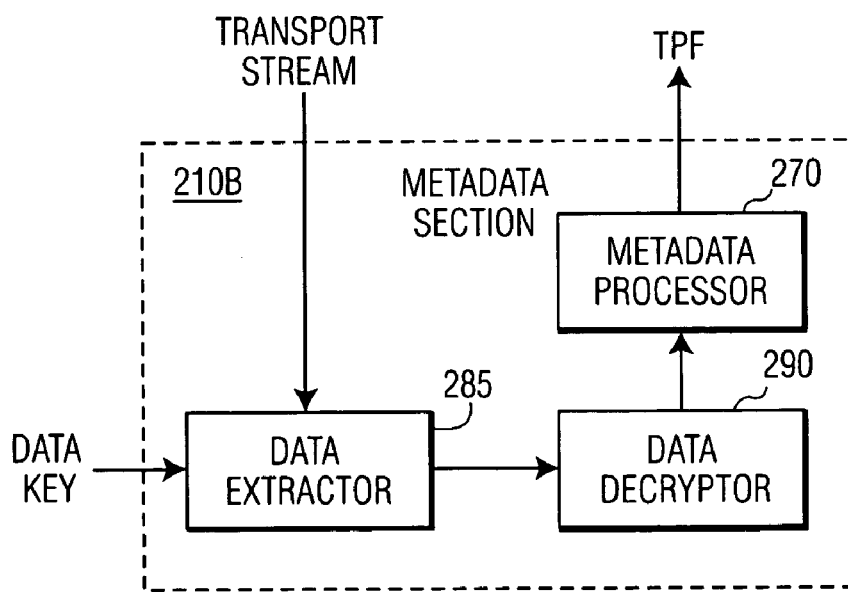
FIG. 4 is schematic diagram of a second alternative metadata section for the system of FIG. 2 for creating trick-mode pointers according to a third embodiment of the present invention.

FIG. 4 is schematic diagram of a second alternative metadata section for the system of FIG. 2 for creating trick-mode pointers according to a third embodiment of the present invention. Metadata section 210B is similar to metadata section 210A illustrated in FIG. 3 described supra. The difference between Metadata section 210B and metadata section 210A is metadata section 210B does not have a data key extractor, as the data key(s) are not part of the transport stream but is supplied as a separate signal to system unit 200 (see FIG. 2). A satellite system is an example of a program delivery system that could use a separate data key signal. The data key(s) itself may be provided by the program provider or a third party.

Figure 5:
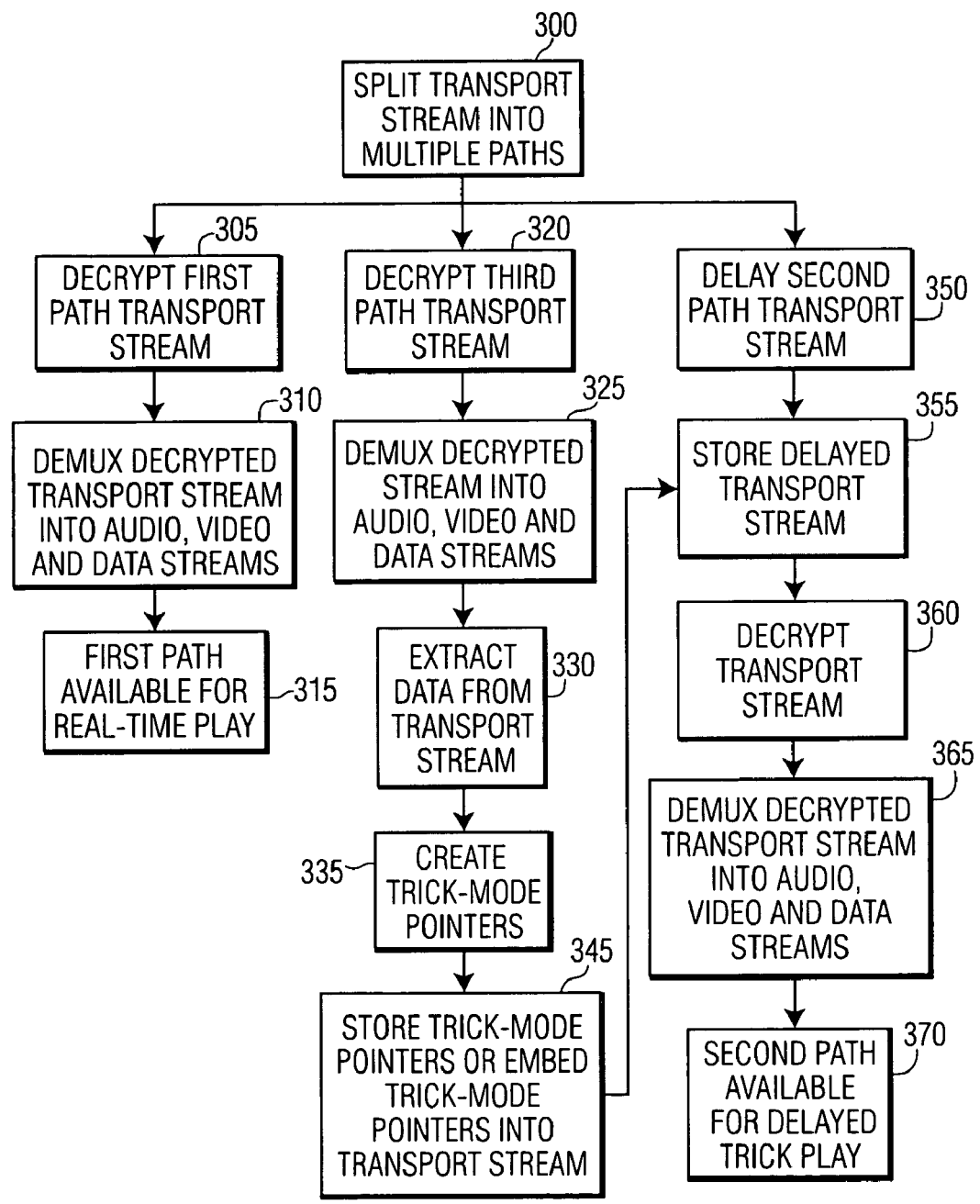
FIG. 5 is a flowchart illustrating the method steps for trick-mode play of audio/video streams according to a first embodiment of the present invention.

FIG. 5 is a flowchart illustrating the method steps for trick-mode play of audio/video streams according to a first embodiment of the present invention. In step 300, the transport stream is split along three paths. In step 305, the first path transport stream is decrypted using a CA key and decryption keys contained within the transport stream and then in step 310, the decrypted transport stream is demuxed into audio, video and data streams. In step 315, the audio, video and data streams derived from the first path are made available for real-time play.

In step 320, the third path transport stream is decrypted using a CA key and decryption keys contained within the transport stream and then in step 325, the decrypted transport stream is demuxed into audio, video and data streams. In step 330, metadata is extracted from the data stream and in step 335, the extracted metadata used to create trick-mode pointers, which in step 345, are either stored on storage medium in step 355 along with the delayed transport stream or inserted into the transport stream and then the modified transport stream containing trick-mode pointers is stored on storage medium in step 355. Trick-mode pointers include the location of decryption keys in the encrypted transport stream that are used for delayed play decrypting of the transport stream with trick-mode included.

In step 350, propagation of the second path transport stream is delayed for an amount of time based on the time required to process the third path transport stream and generate trick-mode pointers. As noted supra, the stored transport stream or the modified transport stream is stored on storage medium in step 355. The stored transport stream remains encrypted as delivered by the service provider. Playback with trick-mode available starts by decrypting the modified transport stream in step 360 and then demuxing the decrypted modified transport stream into audio, video and data streams having trick-mode pointers ready for trick-mode play in step 370.

Figure 6:
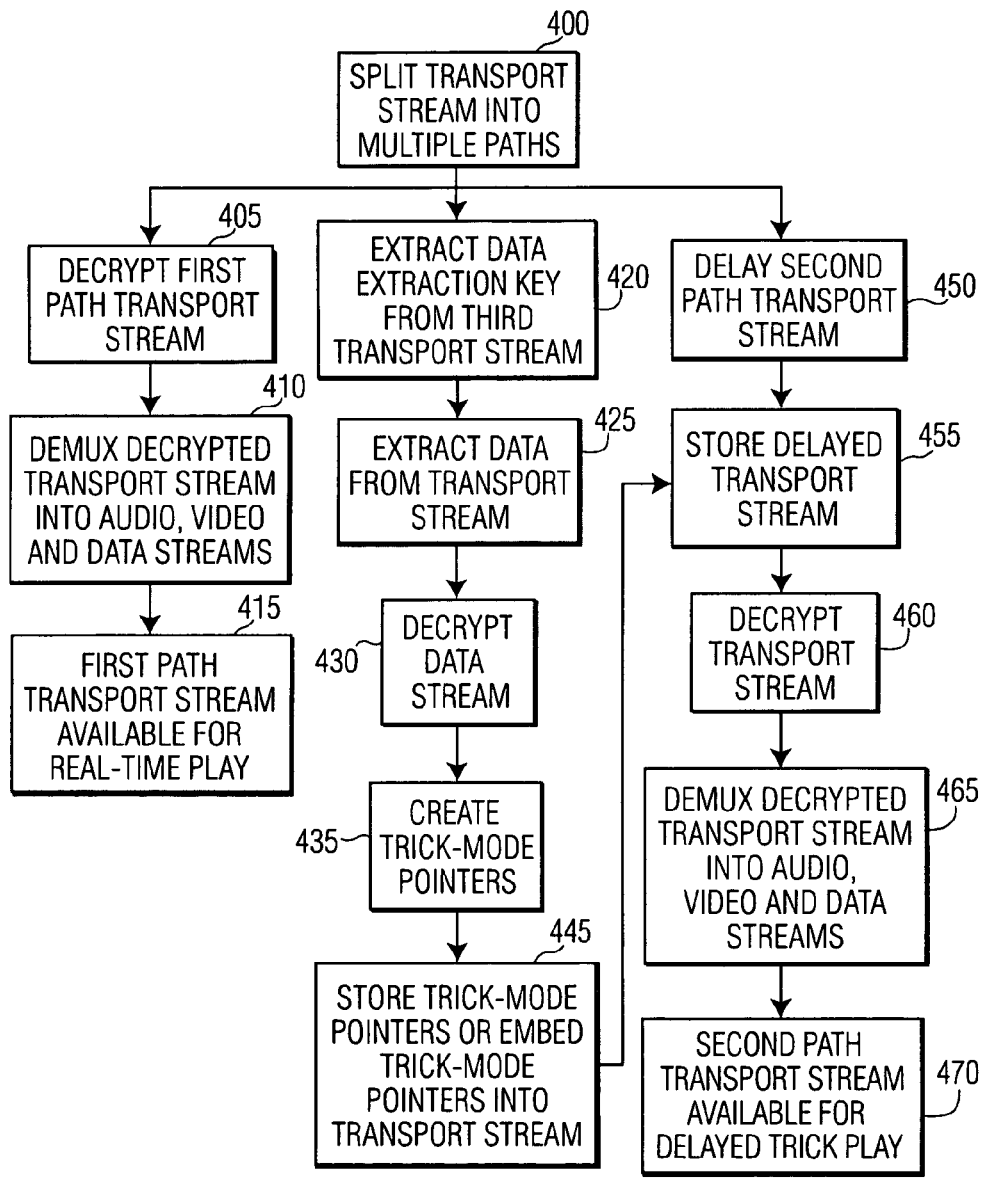
FIG. 6 is a flowchart illustrating the method steps for trick-mode play of audio/video streams according to a second embodiment of the present invention.

FIG. 6 is a flowchart illustrating the method steps for trick-mode play of audio/video streams according to a second embodiment of the present invention. FIG. 6 is similar to FIG. 5 in that steps 405, 410, 415, 435, 445, 450, 455, 460, 465 and 470 of FIG. 5 are identical, respectively, to steps 305, 310, 315, 335, 345, 350, 355, 360, 365 and 370 of FIG. 4. In the second embodiment, the transport stream contains a service provider supplied data decryption key. The data decryption key allows identification and access to only the packets making up the data stream in the transport stream and not the video or audio packets in the transport stream. The data encryption key is accessed using the user provided CA key. In step 420, the data decryption key is extracted from the third path transport stream. In step 425, the data packets are extracted from the transport stream using the data decryption key. Then in step, 430, the extracted data packets are converted into a data stream.

As an alternative, CA keys may not be included in the transport stream, but may be supplied as a separate signal that is delivered to the decryption hardware and metadata processor directly.

Figure 7:
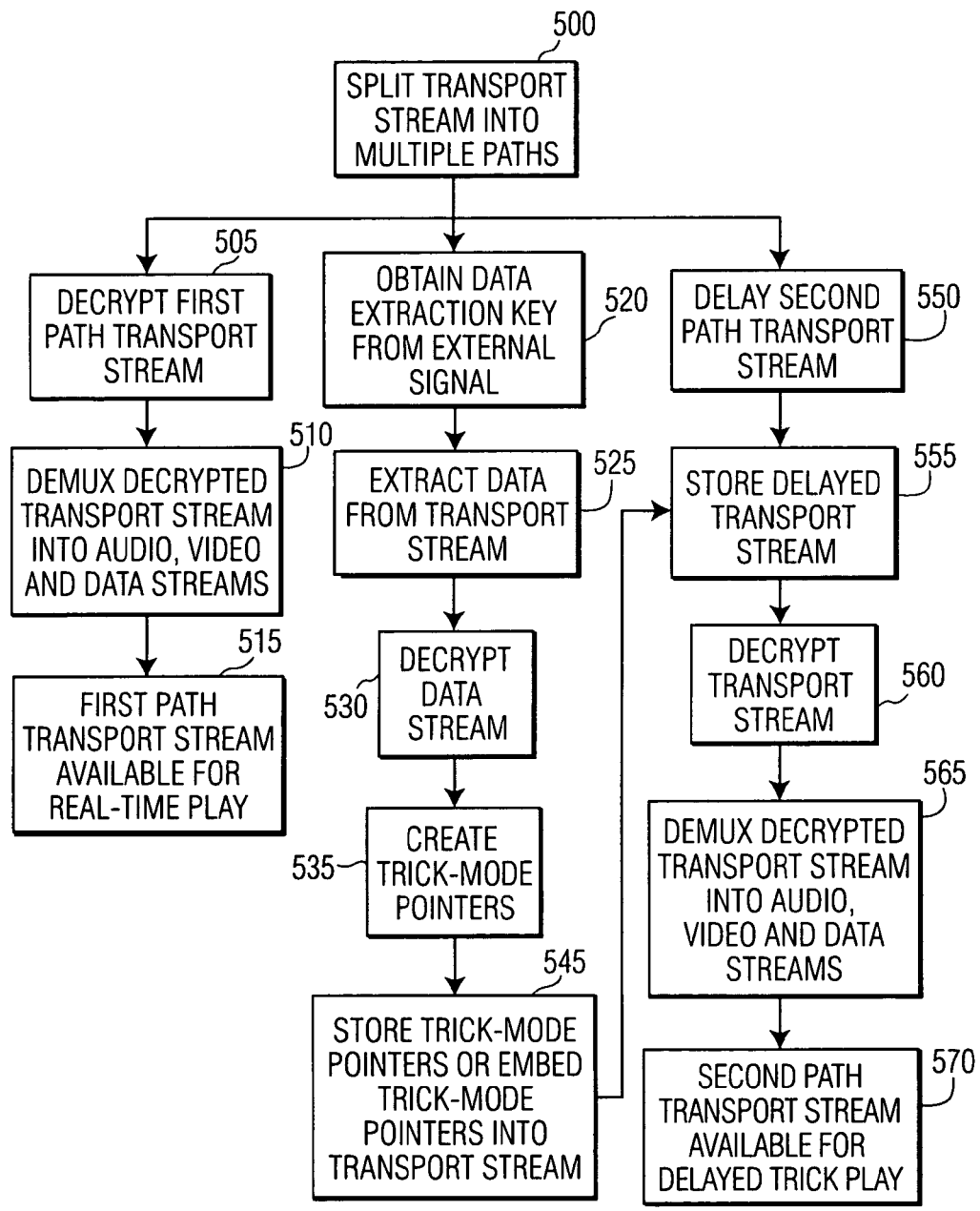
FIG. 7 is a flowchart illustrating the method steps for trick-mode play of audio/video streams according to a third embodiment of the present invention.

FIG. 7 is a flowchart illustrating the method steps for trick-mode play of audio/video streams according to a third embodiment of the present invention. FIG. 7 is similar to FIG. 6 in that steps 505, 510, 515, 525, 530 535, 545, 550, 555, 560, 565 and 570 of FIG. 7 are identical, respectively, to steps 405, 410, 415, 425, 430 435, 445, 450, 455, 460, 465 and 470 of FIG. 6. In the third embodiment of the present invention step 520 simply obtains the data extraction key from a signal separate from the transport stream itself. The data key(s) itself may be provided by the program provider or a third party.

Thus, in all three embodiments of the present invention, trick play mode is enabled while still maintaining the service providers CA and at no time is unencrypted audio/video/data program information stored or stored with any other form of encryption except the service providers CA.

Therefore, the present invention overcomes the problems associated the use of non-service provider transport stream encryption of stored transport streams.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, trick-mode pointers may be stored in a trick-mode pointer file separate from the encrypted transport stream on the same or different storage medium. Therefore, it is intended that the following claims cover all such modifications and changes as fall within the true spirit and scope of the invention.

What is claimed is:

1. A method for trick-mode play of audio/video/data information conveyed by an encrypted transport stream provided by a service provider comprising:
   splitting an encrypted transport stream into at least two duplicate encrypted component streams;
   extracting and decrypting from a first encrypted component stream, wherein the metadata is conveyed solely in a data stream within the first encrypted component stream and wherein the metadata conveys information about the audio/video information;
   creating trick-mode pointers from said metadata;
   delaying a second encrypted component stream;
   sending the trick-mode pointers to a storage medium, wherein the storage medium receives the delayed second encrypted component stream synchronously with the receipt of the trick-mode pointers; and
   inserting said trick-mode pointers into the delayed second encrypted component stream as the delayed second encrypted component stream is stored on the storage medium.

2. The method of claim 1, wherein decryption keys for decrypting said encrypted transport stream are contained within said encrypted transport stream.

3. The method of claim 1, wherein said trick-mode pointers include the location, within said encrypted transport stream, of encryption keys.

4. The method of claim 1, wherein the encrypted transport stream is encrypted by a provider of the encrypted transport stream using a conditional access encryption key.

5. A method of creating an encrypted trick-mode transport stream comprising audio/video/data information for delayed play comprising:
   splitting an encrypted transport stream into at least two duplicate encrypted component streams;
   decrypting a first encrypted component stream to create a decrypted component stream;
   demuxing the decrypted component stream to extract at least a data stream;
   creating trick-mode pointers from metadata conveyed solely within said data stream, wherein the metadata conveys information about the audio/video information;
   delaying a second encrypted component stream; and
   modifying the delayed second component stream by inserting said trick-mode pointers into the delayed second encrypted component stream.

6. The method of claim 5, wherein decryption keys for decrypting said encrypted transport stream are contained within said encrypted transport stream.

7. The method of claim 5, wherein said trick-mode pointers include the location, within said encrypted transport stream, of encryption keys.

8. The method of claim 5 further comprising storing the modified delayed second encrypted stream on a storage medium.

9. The method of claim 5, wherein said transport stream is encrypted by a provider of said encrypted transport stream using a conditional access encryption key.

10. A system for trick-mode play of audio/video/data conveyed by an encrypted transport stream comprising:
    a splitter for splitting the encrypted transport stream into at least three duplicate encrypted component streams;
    a transport stream decryptor for decrypting a first encrypted component stream into a first decrypted component stream;
    a transport stream demuxer for demuxing the first decrypted component stream into an audio stream, a video stream and a data stream;
    a metadata section for receiving a second encrypted component stream, for deriving a data stream from the second encrypted component stream, for creating trick-mode pointers from metadata conveyed solely by said data stream, wherein the metadata conveys information about the audio/video information, and for sending the trick-mode pointers to a storage medium;
    a delay device for delaying a third encrypted component stream; and
    the storage medium for receiving the delayed third encrypted component stream synchronously with the receipt of the trick-mode pointers, wherein the trick-mode pointers are inserted into the delayed third encrypted component stream and stored in the storage medium.

11. The system of claim 10 further comprising switch for selecting between the first encrypted component stream and the delayed third encrypted component stream comprising the trick-mode pointers as stored in the storage medium for delivery to the transport stream decryptor.

12. The system of claim 10, wherein said encrypted transport stream is encrypted by the transport stream provider using conditional access encryption.

13. The system of claim 10 further comprising an audio video decoder and decompressor for collectively converting said audio and video streams into displayable format.

14. A system for trick-mode play of audio/video/data information conveyed by an encrypted transport stream comprising:
    a splitter for splitting the encrypted transport stream into at least three duplicate encrypted component streams;
    a first component stream decryptor for decrypting a first encrypted component stream into a first decrypted component stream;
    a first component stream demuxer for demuxing said first decrypted component stream into an audio stream, a video stream and a data stream;
    a metadata section, said metadata section comprising:
        a second component stream decryptor for decrypting a second encrypted component stream into a second decrypted component stream;
        a second component stream demuxer for demuxing the second decrypted component stream into an audio stream, a video stream and a data stream; and
        a metadata processor for receiving the data stream from the second encrypted component stream, creating trick-mode pointers from metadata conveyed solely by said data stream, wherein the metadata conveys information about the audio/video information, and for sending the trick-pointers to a storage medium;
    delay means for creating a time-delayed third encrypted component stream;
    and
    control means for synchronized insertion of the trick-mode pointers into the time-delayed third encrypted component stream as the time-delayed encrypted component stream is written to said storage medium.

15. The system of claim 14 further comprising means for selecting between the first encrypted component stream and the delayed third encrypted component stream comprising the trick-mode pointers as stored in the storage medium for delivery to the component stream system input and said storage medium.

16. The system of claim 15 further comprising an audio video decoder and decompressor for collectively converting said audio and video streams into displayable format.

17. The system of claim 14, wherein said encrypted transport stream is encrypted by the transport stream provider using a conditional access encryption key.

* * * * *